(12) United States Patent
Novak et al.

(10) Patent No.: US 11,504,604 B2
(45) Date of Patent: Nov. 22, 2022

(54) METHODS, DEVICES, SYSTEMS, AND COMPUTER PROGRAM PRODUCTS FOR CREATING THREE-DIMENSIONAL PUZZLES

(71) Applicant: Sony Group Corporation, Tokyo (JP)

(72) Inventors: Lars Novak, Bjärred (SE); Henrik Vallgren, Furulund (SE); Carl Hartzell, Lund (SE); Hans Bjerndell, Malmö (SE)

(73) Assignee: Sony Group Corporation, Tokyo (JP)

( * ) Notice: Subject to any disclaimer, the term of this patent is extended or adjusted under 35 U.S.C. 154(b) by 399 days.

(21) Appl. No.: 16/642,521

(22) PCT Filed: Aug. 31, 2017

(86) PCT No.: PCT/US2017/049596
§ 371 (c)(1),
(2) Date: Feb. 27, 2020

(87) PCT Pub. No.: WO2019/045726
PCT Pub. Date: Mar. 7, 2019

(65) Prior Publication Data
US 2021/0069580 A1 Mar. 11, 2021

(51) Int. Cl.
*G06T 17/20* (2006.01)
*A63F 9/12* (2006.01)
*G06F 3/12* (2006.01)
*G06T 19/20* (2011.01)

(52) U.S. Cl.
CPC .......... *A63F 9/1288* (2013.01); *G06F 3/1208* (2013.01); *G06F 3/1252* (2013.01); *G06F 3/1256* (2013.01); *G06T 17/20* (2013.01); *G06T 19/20* (2013.01); *A63F 2009/1296* (2013.01); *A63F 2250/505* (2013.01); *G06T 2219/2008* (2013.01); *G06T 2219/2016* (2013.01)

(58) Field of Classification Search
CPC .... A63F 9/1288; G06F 3/1208; G06F 3/1252; G06T 17/20; G06T 19/20
USPC ....................................................... 273/156
See application file for complete search history.

(56) References Cited

U.S. PATENT DOCUMENTS

| | | |
|---|---|---|
| 8,248,417 B1 | 8/2012 | Clifton |
| 8,628,393 B1 | 1/2014 | Bachrach et al. |
| 10,195,519 B2 * | 2/2019 | Bachrach ................ G06T 17/20 |

(Continued)

OTHER PUBLICATIONS

Cagan, J, et al., "A survey of computational approaches to three-dimensional layout problems," Computer-Aided Design 34, 2002, pp. 597-611.

(Continued)

*Primary Examiner* — Thomas J Lett
(74) *Attorney, Agent, or Firm* — Myers Bigel, P.A.

(57) ABSTRACT

The method of creating a three-dimensional (3D) puzzle of an object includes receiving a 3D model of the object; sequentially extracting a plurality of preliminary segments from the 3D model, and generating a plurality of two-dimensional (2D) printable segments corresponding to the plurality of preliminary segments. The plurality of printable segments may be configured to be printed to create a plurality of printed segments that may be configured to be selectively coupled together to form a 3D representation of the object.

20 Claims, 17 Drawing Sheets

(56) References Cited

U.S. PATENT DOCUMENTS

| | | | |
|---|---|---|---|
| 2012/0049452 A1 | 3/2012 | Latour et al. | |
| 2012/0158369 A1* | 6/2012 | Bachrach | G06T 17/205 |
| | | | 703/1 |
| 2014/0194174 A1* | 7/2014 | Bachrach | G06T 17/20 |
| | | | 463/9 |
| 2015/0142151 A1* | 5/2015 | Todorov | G09F 1/06 |
| | | | 700/98 |
| 2015/0290532 A1* | 10/2015 | Boulding | A63F 9/12 |
| | | | 273/156 |

OTHER PUBLICATIONS

International Search Report and Written Opinion for PCT/US2017/049596 dated Jul. 30, 2018, 16 pages.

* cited by examiner

METHODS, DEVICES, SYSTEMS, AND COMPUTER PROGRAM PRODUCTS FOR CREATING THREE-DIMENSIONAL PUZZLES

CROSS REFERENCE TO RELATED APPLICATION

This application is a 35 U.S.C. § 371 national stage application of PCT International Application No. PCT/US2017/049596, filed on Aug. 31, 2017, the content of which is incorporated herein by reference in its entirety. The above-referenced PCT International Application was published in the English language as International Publication No. WO 2019/045726 A1 on Mar. 7, 2019.

BACKGROUND

There is considerable interest in various parts of the world to make things out of paper, including paper models, paper mache, and origami. For example, origami is hugely popular in Japan and has been part of Japanese culture for hundreds of years. There is also a big interest in puzzle solving around the world. It would therefore be desirable to automatically generate a three-dimensional paper puzzle that can be constructed to represent a three-dimensional object.

SUMMARY

Some embodiments of the present invention are directed to a method of creating a three-dimensional (3D) puzzle of an object. The method includes receiving a 3D model of the object, sequentially extracting a plurality of preliminary segments from the 3D model, and generating a plurality of two-dimensional (2D) printable segments corresponding to the plurality of preliminary segments. The plurality of printable segments may be configured to be printed to create a plurality of printed segments that are configured to be selectively coupled together to form a 3D representation of the object.

The 3D model may include a polygon mesh. Sequentially extracting a plurality of preliminary segments from the 3D model may include, for each preliminary segment, selecting a random polygon from the polygon mesh that has not been selected for another one of the plurality of preliminary segments as an initial polygon. The initial polygon may be included as part of the preliminary segment. Sequentially extracting a plurality of preliminary segments from the 3D model may include sequentially extracting the plurality of preliminary segments from the polygon mesh until each one of the polygons of the polygon mesh has been selected for one of the plurality of preliminary segments.

In some embodiments, the polygon mesh is a triangle mesh and the initial polygon is an initial triangle. Sequentially extracting a plurality of preliminary segments from the 3D model may include, for each preliminary segment: constructing a first direction segment in a first direction away from the initial triangle; constructing a second direction segment in a second direction, different than the first direction, away from the initial triangle; and/or constructing a third direction segment in a third direction, different than the first and second direction, away from the initial triangle. The method may include selecting the one of the first, second and third direction segments that has the longest length as the preliminary segment.

In some embodiments, constructing a first direction segment includes selecting triangles from the triangle mesh that are intersected by a first straight line that extends in the first direction away from the initial triangle until the first line intersects a triangle that has previously been selected for another one of the preliminary segments or until a length of the first direction segment reaches a predetermined threshold length; constructing a second direction segment includes selecting triangles from the triangle mesh that are intersected by a second straight line that extends in the second direction away from the initial triangle until the second line intersects a triangle that has previously been selected for another one of the preliminary segments or until a length of the second direction segment reaches the predetermined threshold length; and/or constructing a third direction segment by selecting triangles from the triangle mesh that are intersected by a third straight line that extends in the third direction away from the initial triangle until the third line intersects a triangle that has previously been selected for another one of the preliminary segments or until a length of the third direction segment reaches the predetermined threshold length.

The first line may extend in the first direction from a center of the initial triangle and through a midpoint of a first edge of the initial triangle. The second line may extend in the second direction from the center of the initial triangle and through a midpoint of a second edge of the initial triangle. The third line may extend in the third direction from the center of the initial triangle and through a midpoint of a third edge of the initial triangle.

In some embodiments, the method includes: rotating the selected triangles in the first direction segment into the same plane as the initial triangle; rotating the selected triangles in the second direction segment into the same plane as the initial triangle; and/or rotating the selected triangles in the third direction segment into the same plane as the initial triangle.

In some embodiments, sequentially extracting a plurality of preliminary segments from the 3D model includes, for each preliminary segment: selecting triangles in a set of triangles that share a common vertex with the initial triangle; selecting an outer triangle that has an edge that is connected to an edge of one of the triangles in the set of triangles that does not share an edge with another one of the triangles in the set of triangles; selecting triangles that are intersected by a circular or spiral path extending from the outer triangle and around the set of triangles until the circular or spiral path intersects a triangle that has previously been selected for another one of the preliminary segments; and optionally rotating the selected triangles into the same plane as the initial triangle.

In some embodiments, the 3D model includes texture data corresponding to the polygon or triangle mesh. Generating a plurality of 2D printable segments corresponding to the plurality of preliminary segments may include applying texture from the texture data to each of the plurality of preliminary segments. Applying texture from the texture data to each of the plurality of preliminary segments may include mapping texture from the texture data using UV coordinates for vertices of each polygon or triangle in the preliminary segment.

In some embodiments, generating a plurality of 2D printable segments corresponding to the plurality of preliminary segments includes adding a plurality of flaps to each preliminary segment. One of the flaps may extend from each edge of each polygon or triangle in the preliminary segment that is not connected with another polygon or triangle in the preliminary segment. The method may include applying texture to each flap using the texture data at the edge of the polygon or triangle from which the flap extends. The method may include adding indicia to each flap. The indicia on one flap of one of the printable segments may uniquely match the indicia on one flap of another one of the printable segments to indicate that the flaps should be coupled together. The indicia may include a number and/or a letter.

In some embodiments, the object is or includes a head of a person.

In some embodiments, the plurality of printable segments comprise at least 50 segments or at least 100 segments.

The method may include providing the plurality of printable segments to a printer and/or printing the plurality of printable segments to create the plurality of printed segments that correspond to the plurality of printable segments.

The method may include selectively coupling the printed segments to one another to form the 3D representation of the object.

Some other embodiments of the present invention are directed to a system for creating a three-dimensional (3D) puzzle of an object. The system may include an electronic device including: a processor; and a storage medium coupled to the processor and including computer readable program code that when executed by the processor causes the processor to perform various operations described herein. The system may include a printer configured to print the plurality of printable segments to create the printed segments, optionally under the direction of the electronic device.

Some other embodiments of the present invention are directed to an electronic device including: a processor; and a storage medium coupled to the processor and including computer readable program code that when executed by the processor causes the processor to perform various operations described herein.

Some other embodiments of the present invention are directed to a computer program product including a non-transitory computer readable storage medium including computer readable program code embodied in the medium that when executed by a processor causes the processor to perform various operations described herein.

Further features, advantages and details of the invention will be appreciated by those of ordinary skill in the art from a reading of the figures and the detailed description of the preferred embodiments that follow, such description being merely illustrative of the invention.

DETAILED DESCRIPTION

Embodiments described herein allow for a three-dimensional (3D) paper puzzle to be generated automatically. More specifically, the 3D puzzle may be generated automatically with only a 3D model as input. A user is not required to manually edit the segments of the puzzle or to manually add or edit flaps associated with the segments. This provides advantages over known 3D puzzle generators wherein substantial manual input is required.

Figure 1:
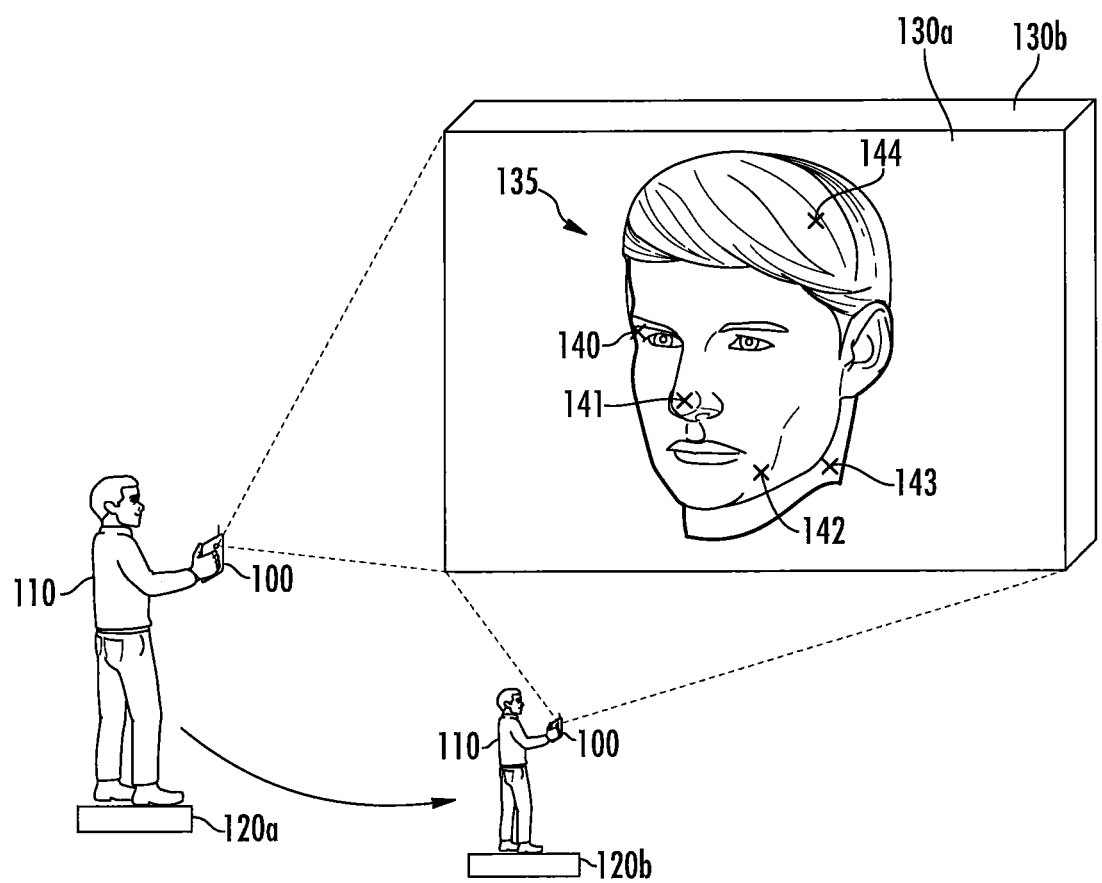
FIG. 1 is a diagram that illustrates a user capturing multiple images of an object with an electronic device according to some embodiments.

FIG. 1 is a diagram that illustrates a user 110 capturing multiple images 130 of an object 135 with an electronic device 100, according to various embodiments of present invention. Although FIG. 1 illustrates an example in which the images 130 are captured by an image capture device 340 (FIG. 15) at the electronic device 100, the images 130 may alternatively be captured by another device and subsequently received by the electronic device 100.

In FIG. 1, the user 110 initiates a photographic session of the object 135, such as a person's face or an automobile, at location 120a. The user 110 may physically move around the object 135 to various locations, such as from the location 120a to a different location 120b. An image 130 of object 135 is captured at each location. For example, image 130a is captured when the electronic device 100 is at the location 120a, and image 130b is captured when the electronic device 100 moves to the different location 120b. The captured images 130 may each be two-dimensional (2D) images.

The electronic device 100 may provide images 130 at various angles as the user 110 walks around the object 135. For example, the user 110 may capture images 130 around 360 degrees (or, alternatively, at least 180 degrees) of the object 135. After capturing at least two images 130, such as the images 130a and 130b, the images 130 may be processed by a processor 350 (FIG. 15) in the electronic device 100, or by a processor external to the electronic device 100, to construct a three-dimensional (3D) model 150 (FIG. 2) of the object 135, or to otherwise generate a 3D image. The terms "construct" (or "constructing"), "generate" (or "generating"), and "build" (or "building") may be used interchangeably herein.

Processing of the images 130 may include identifying points 140-144 of the object 135 as captured in the images 130. The points 140-144 may include various edges, corners, or other points on a surface of the object 135. The points 140-144 may be recognizable locations on the physical object 135 that are tracked in various images 130 of the physical object 135. In some embodiments, constructing a 3D model 150 of the object 135 may involve capturing several (e.g., three, four, five, or more) images 130 of the object 135 and identifying tens, hundreds, or thousands of points 140-144. Locations (e.g., coordinates) of the points 140-144 may be estimated using various modeling/statistical techniques.

Figure 2:
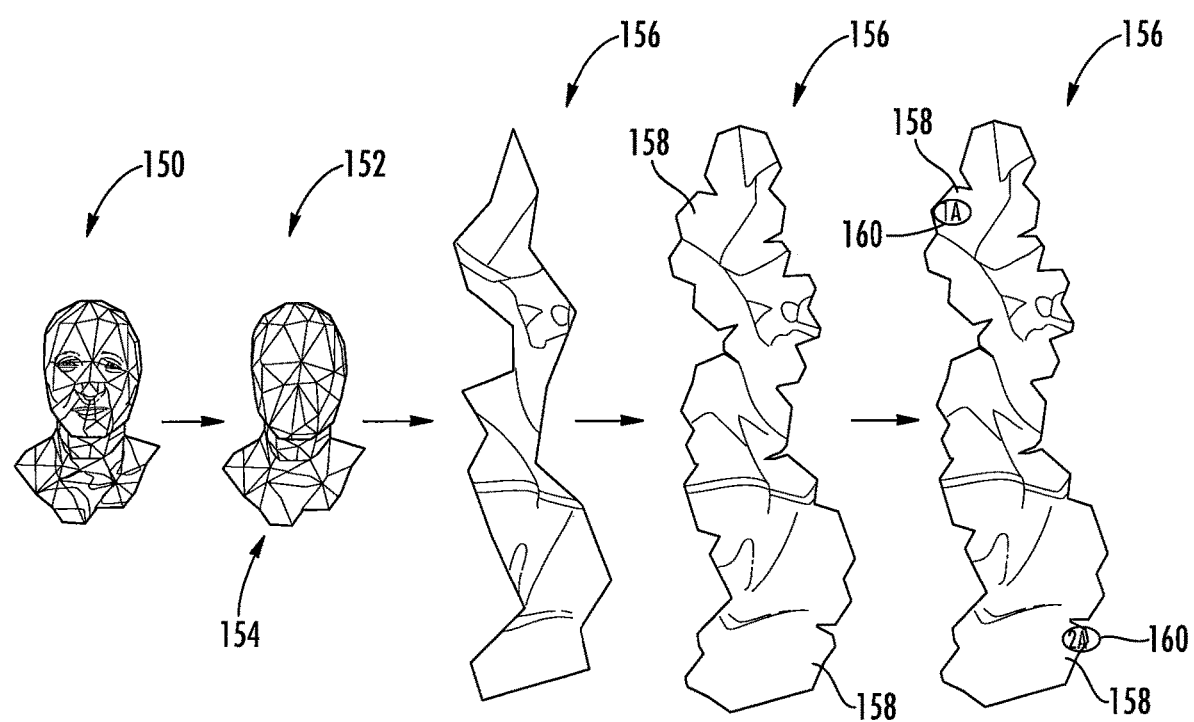
FIG. 2 schematically illustrates the extraction of a preliminary segment from a 3D model of an object and the generation of a printable segment from the preliminary segment according to some embodiments.

FIG. 2 is a diagram that schematically illustrates embodiments of the invention. A 3D model 150 of an object includes a polygon mesh 152. In some embodiments, the polygon mesh 152 is a triangle mesh. As described in more detail below, a plurality of preliminary segments or strips 154 may be extracted from the 3D model 150 (or from the polygon mesh 152). A plurality of two-dimensional (2D) printable segments 156 may be generated that correspond to the plurality of preliminary segments 154. Tabs 158 may extend from peripheral portions of the printable segments 156. Indicia 160 may be added to the tabs 158.

Figure 3:
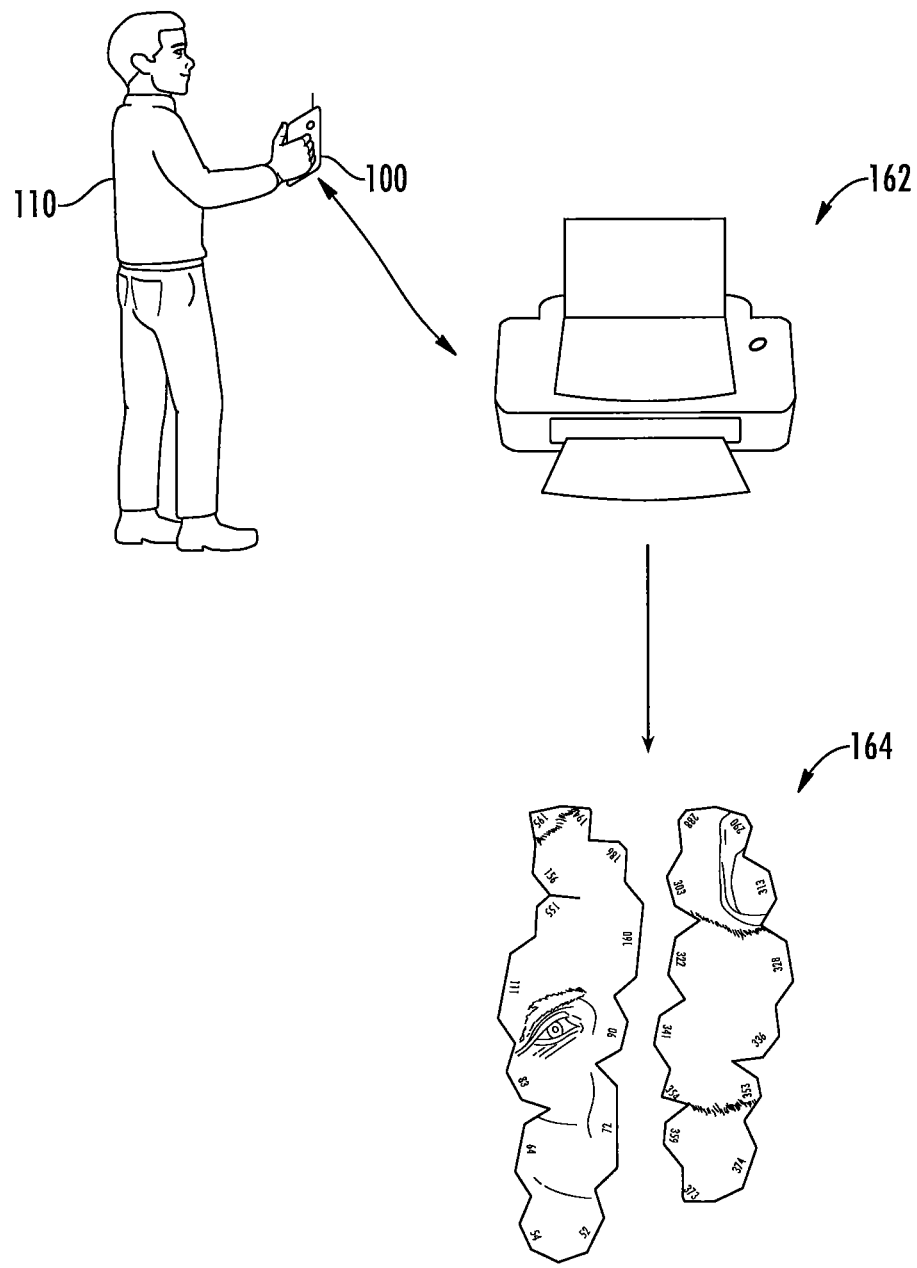
FIG. 3 schematically illustrates a system including an electronic device and a printer according to some embodiments.

FIG. 3 is a diagram that illustrates a user 110 of an electronic device 100 communicating with a printer 162 that prints a plurality of printed segments 164 corresponding to the plurality of printable segments 156 (FIG. 2). For example, the user 110 may provide the printable segments 156 to the printer 162, which may then print the printed segments 164. The printable segments 156 may be provided to the printer 162 as any digital file type that the printer 162 can read.

Figure 4A:
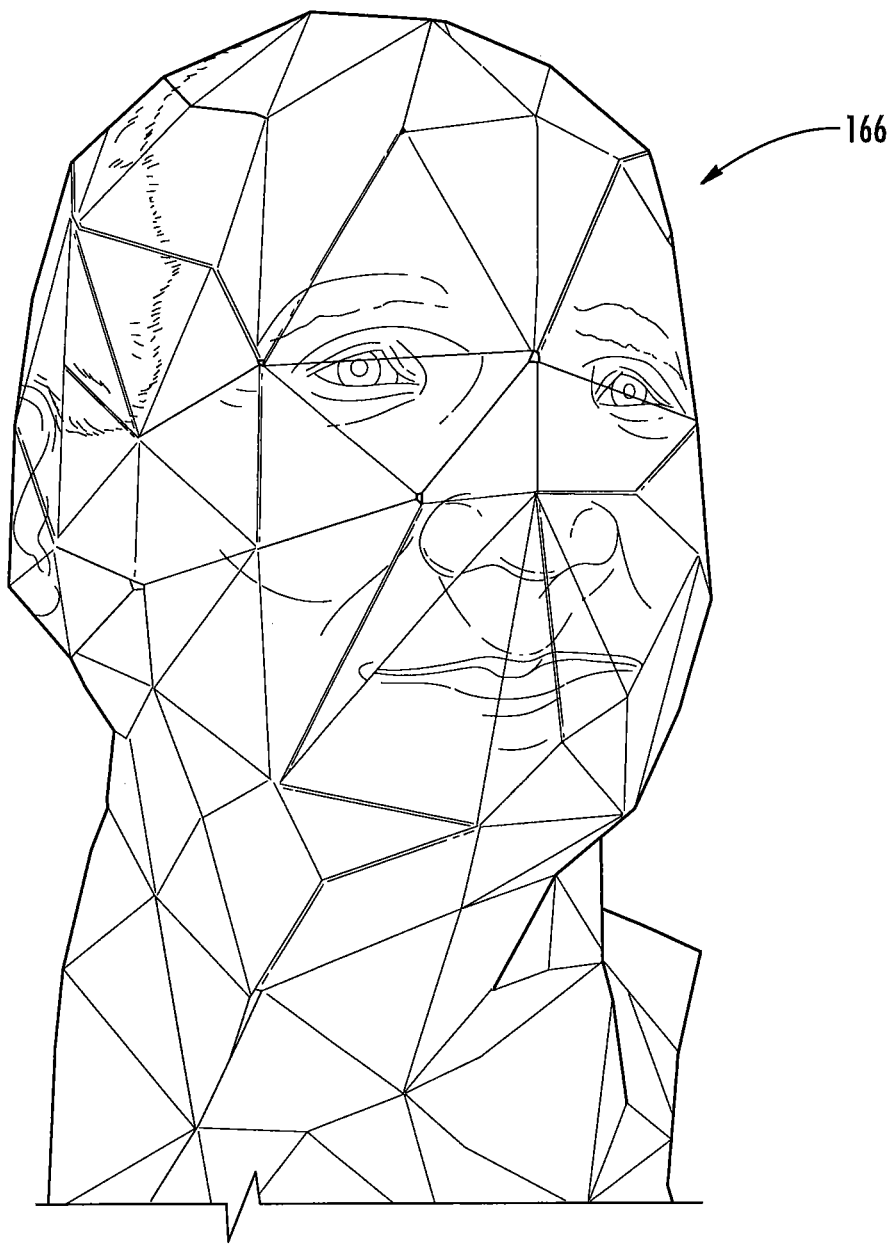
FIGS. 4A and 4B are perspective views of a 3D puzzle that has been constructed by selectively coupling a plurality of printed segments according to some embodiments.
Figure 4B:
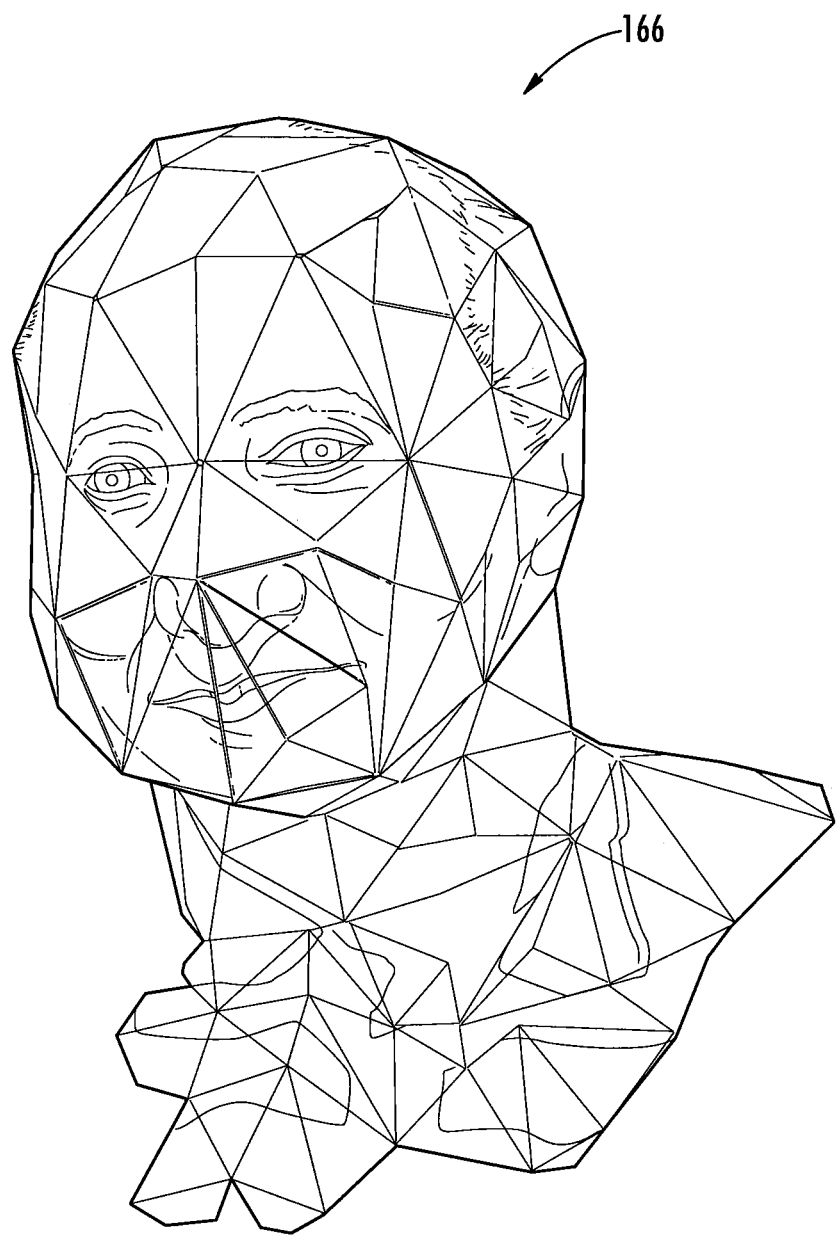

Although only two printed segments 164 are shown in FIG. 3, it will be appreciated that a substantially greater number of printed segments may be printed to form the pieces for the 3D puzzle to be constructed. For example, there may be at least 50 or at least 100 printed segments in various embodiments. The printed segments 164 may then be selectively coupled together to form a 3D representation 166 of the object as illustrated in FIGS. 4A and 4B.

Figure 5:
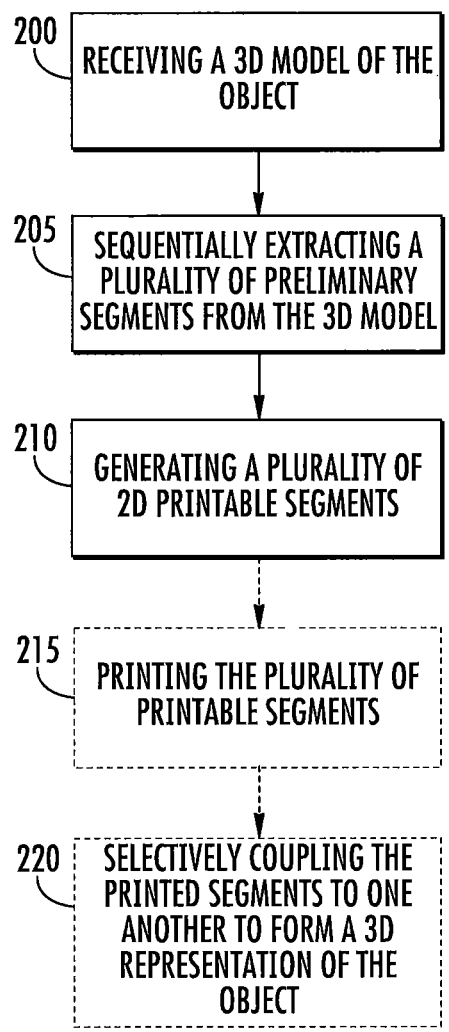
FIGS. 5-9 are flowcharts illustrating example operations according to some embodiments.

Referring to FIG. 5, a method of creating a 3D puzzle of an object includes receiving a 3D model of the object (Block 200), sequentially extracting a plurality of preliminary segments from the 3D model (Block 205), and generating a plurality of 2D printable segments corresponding to the plurality of preliminary segments (Block 210). These operations may be carried out by the electronic device 100 described herein. The method may optionally include printing a plurality of printed segments that correspond to the plurality of printable segments (Block 215). The method may optionally include selectively coupling the printed segments to one another to form a 3D representation of the object (Block 220).

Figure 6:
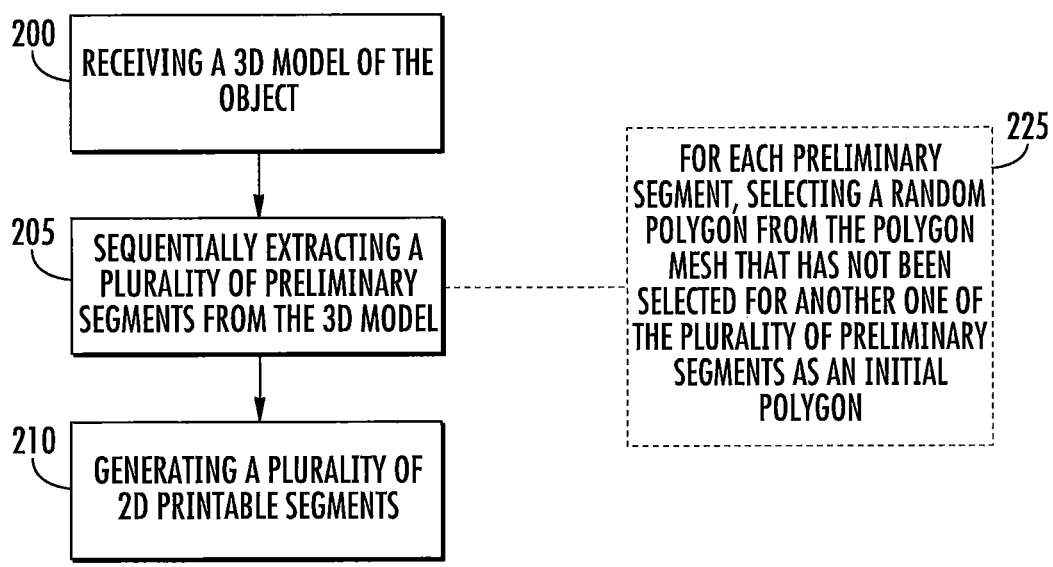

Referring to FIG. 6, extracting the plurality of preliminary segments may include, for each preliminary segment, selecting a random polygon from the polygon mesh that has not been selected for another one of the plurality of preliminary segments as an initial polygon (Block 225). The initial polygon may be included as part of the preliminary segment.

Figure 7:
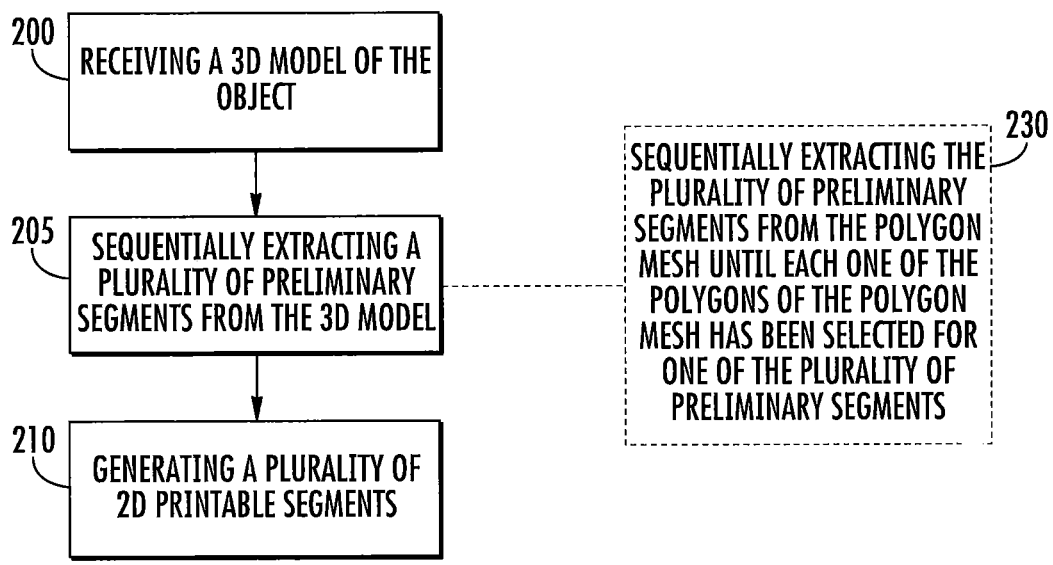

Referring to FIG. 7, extracting the plurality of preliminary segments may include sequentially extracting the plurality of preliminary segments from the polygon mesh until each one of the polygons has been selected for one of the plurality of preliminary segments (Block 230).

Figure 8:
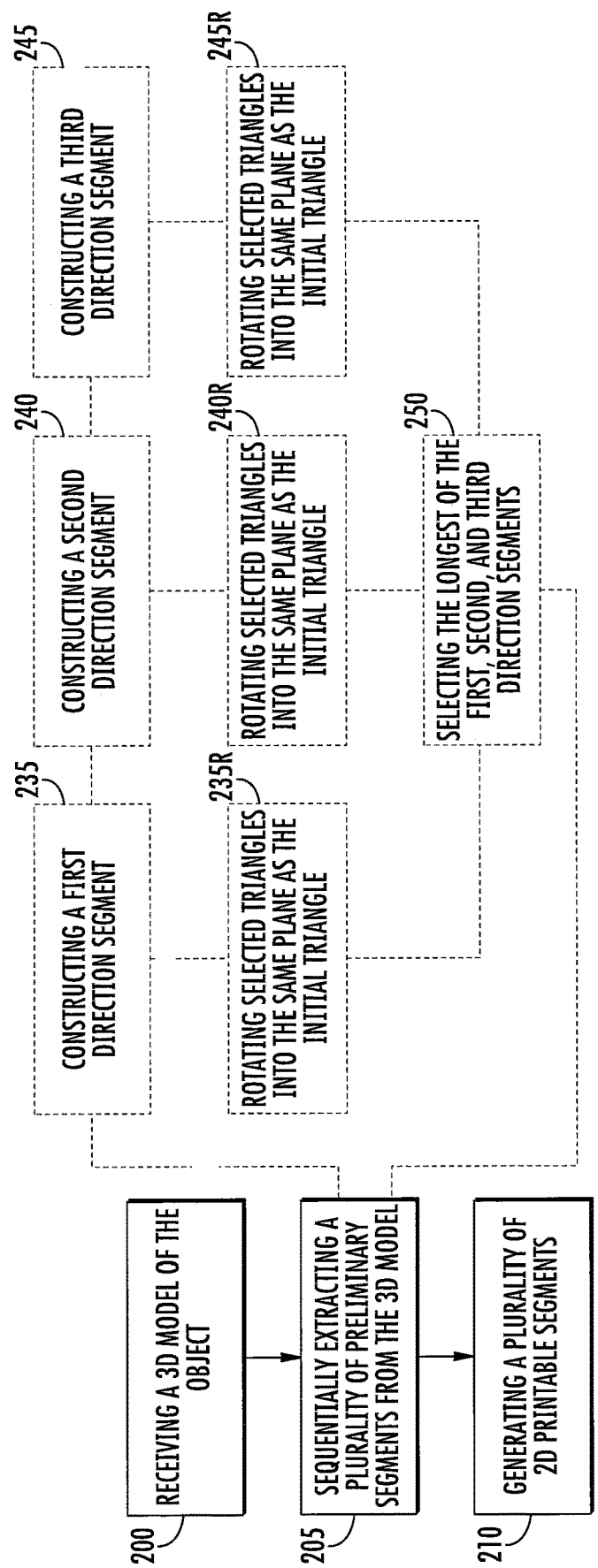

Extracting the plurality of preliminary segments may include, for each preliminary segment, tracing a plurality of lines from the initial triangle to create a plurality of direction segments and selecting the longest of the direction segments (while optionally also keeping the length of the selected segment equal to or less than a predetermined threshold length). Referring to FIG. 8, the method may include constructing a first direction segment (Block 235), constructing a second direction segment (Block 240), and constructing a third direction segment (Block 245). The method may include selecting the one of the first, second and third direction segments that has the longest length as the preliminary segment (Block 250).

Figure 10A:
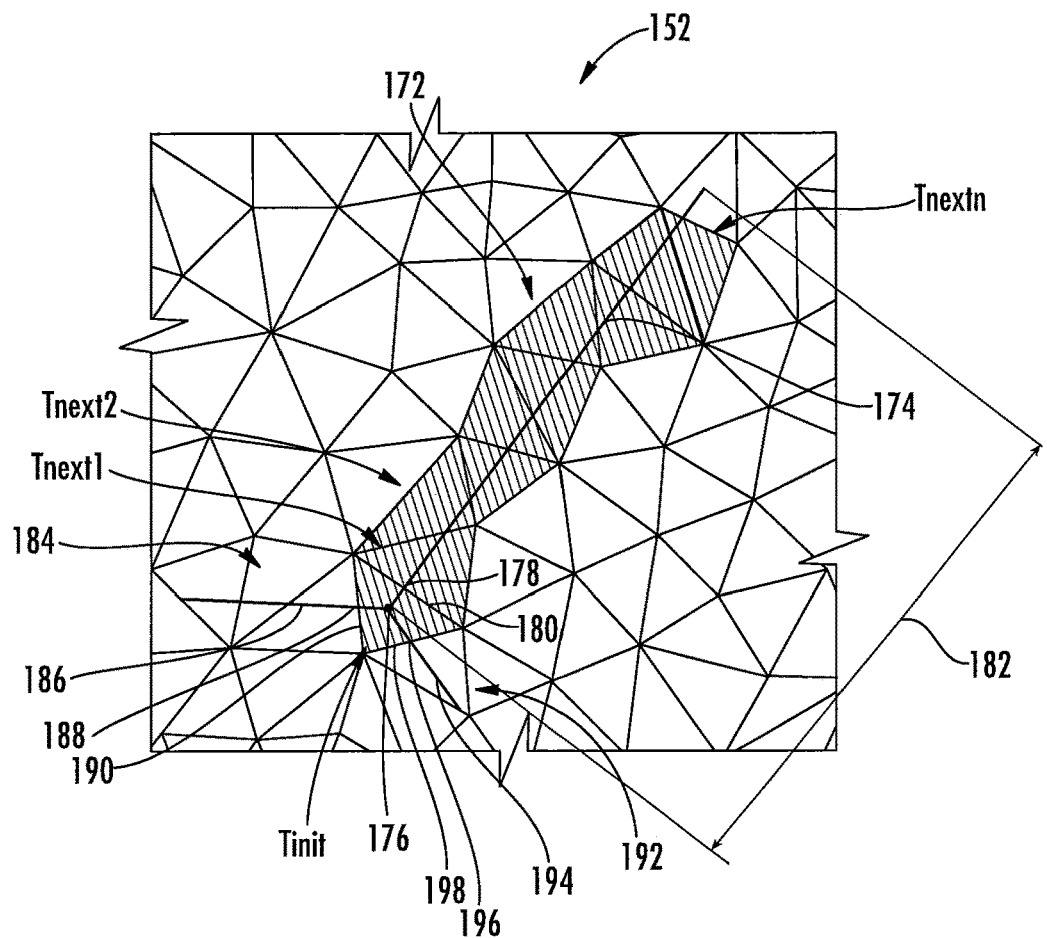
FIG. 10A is a fragmentary view of a triangle mesh illustrating the construction of direction segments according to some embodiments.

Referring to FIG. 10A, constructing a first direction segment 172 may include selecting triangles from the triangle mesh 152 that are intersected by a first straight line 174 that extends in the first direction away from the initial triangle $T_{init}$ until the first line 174 intersects a triangle that has previously been selected for another one of the preliminary segments or until a length of the first direction segment 172 reaches a predetermined threshold length 182. Constructing a second direction segment 184 may include selecting triangles from the triangle mesh 152 that are intersected by a second straight line 186 that extends in the second direction away from the initial triangle $T_{init}$ until the second line 186 intersects a triangle that has previously been selected for another one of the preliminary segments or until a length of the second direction segment 184 reaches the predetermined threshold length 182. Constructing a third direction segment 192 may include selecting triangles from the triangle mesh 152 that are intersected by a third straight line 194 that extends in the third direction away from the initial triangle $T_{init}$ until the third line 194 intersects a triangle that has previously been selected for another one of the preliminary segments or until a length of the third direction segment 192 reaches the predetermined threshold length 182.

Still referring to FIG. 10A, in some embodiments, the initial triangle $T_{init}$ is selected at random. The first direction segment 172 may be generated by tracing the first line 174 from a center 176 of the initial triangle $T_{init}$ in the first direction through a midpoint 178 of a first edge or side 180 of the initial triangle $T_{init}$. Triangles $T_{next1}$ to $T_{nextn}$ that are intersected by the first line 174 in the first direction may be selected until the first line 174 intersects a triangle that has previously been selected for another one of the extracted segments or until the first direction segment 172 has a length that reaches the predetermined threshold length 182.

The second direction segment 184 may be generated by tracing the second line 186 from the center 176 of the initial triangle $T_{init}$ in the second direction through a midpoint 188 of a second edge or side 190 of the initial triangle $T_{init}$. Triangles that are intersected by the second line 186 in the second direction may be selected until the second line 186 intersects a triangle that has previously been selected for another one of the extracted segments or until the second direction segment 184 has a length that reaches the predetermined threshold length 182.

The third direction segment 192 may be created by tracing the third line 194 from the center 176 of the initial triangle $T_{init}$ in the third direction through a midpoint 196 of a third edge or side 198 of the initial triangle $T_{init}$. Triangles that are intersected by the third line 194 in the third direction may be selected until the third line 194 intersects a triangle that has previously been selected for another one of the extracted segments or until the third direction segment 192 has a length that reaches the predetermined threshold length 182.

The one of the first, second and third direction segments 172, 184 and 192 that has the longest length may be selected as the preliminary segment to be extracted. In FIG. 10A, the first direction segment 172 has the longest length and is therefore selected as the preliminary segment to be extracted. The second and third direction segments 184 and 192 may have a shorter length because the second and third lines 186 and 194 may have intersected a triangle that was previously selected for another one of the preliminary segments and/or may have terminated at a terminal edge of the triangle mesh 152.

Referring again to FIG. 8, in some embodiments, the method includes rotating the selected triangles in the first direction segment into the same plane as the initial triangle (Block 235R), rotating the selected triangles in the second direction segment into the same plane as the initial triangle (Block 240R), and/or rotating the selected triangles in the third direction segment into the same plane as the initial triangle (Block 245R).

For example, with reference to FIG. 10A, the first line 174 extends from the initial triangle $T_{init}$ and intersects the next triangle $T_{next1}$. The next triangle $T_{next1}$ may then be rotated into the same plane as the initial triangle $T_{init}$. The first line 174 then intersects the next triangle $T_{next1}$. The next triangle $T_{next2}$ may then be rotated into the same plane as the initial triangle $T_{init}$ (and the triangle $T_{next1}$). This process may be completed for all the next triangles $T_{next1}$ to $T_{nextn}$.

The above-described operations may be carried out by the following algorithm described in pseudo code.

```
FIND SEGMENTS(start) {
TRIANGLE cur_triangle = start, prev_triangle
VECTOR direction[3]
LIST segment[3]
NUMERAL length, threshold
ROTATE_TO_PLANE(cur_triangle, PLANE(XY_PLANE))
FOR EACH direction:
    WHILE length < threshold
        EDGE next_edge = INTERSECTS(direction[CUR_DIRECTION],
    EDGES(cur_triangle))
        prev_triangle = cur_triangle
        cur_triangle = CONNECTED_BY_EDGE(next_edge, prev_triangle)
        IF NOT MARKED(cur_triangle) AND LENGTH_TO(cur_triangle) <
threshold
            ROTATE_TO_PLANE(cur_triangle, PLANE(prev_triangle)
            ADD_TO_SEGMENT (segment[CURRENT_SEGMENT],
cur_triangle)
            MARK(cur_triangle)
            length = LENGTH_TO(cur_triangle)
        ELSE:
            BREAK
    END WHILE
    cur_triangle = start
END FOR
max_segment = MAX_LENGTH(segment)
UNMARK_ALL_EXCLUDING_MAX( )
RETURN max_segment
}
```

Figure 11:
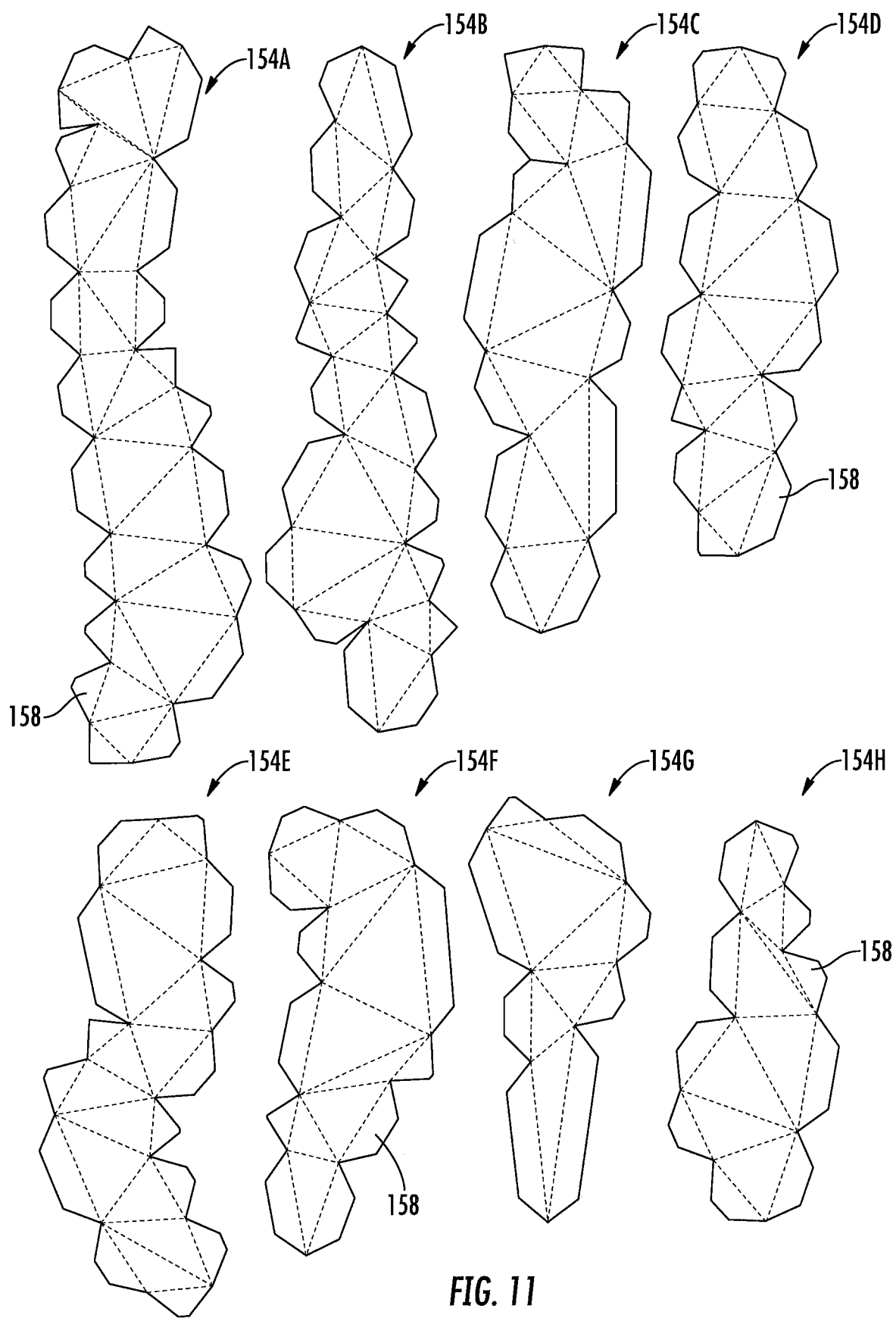
FIGS. 11 and 12 illustrate a plurality of preliminary segments according to some embodiments.
Figure 12:
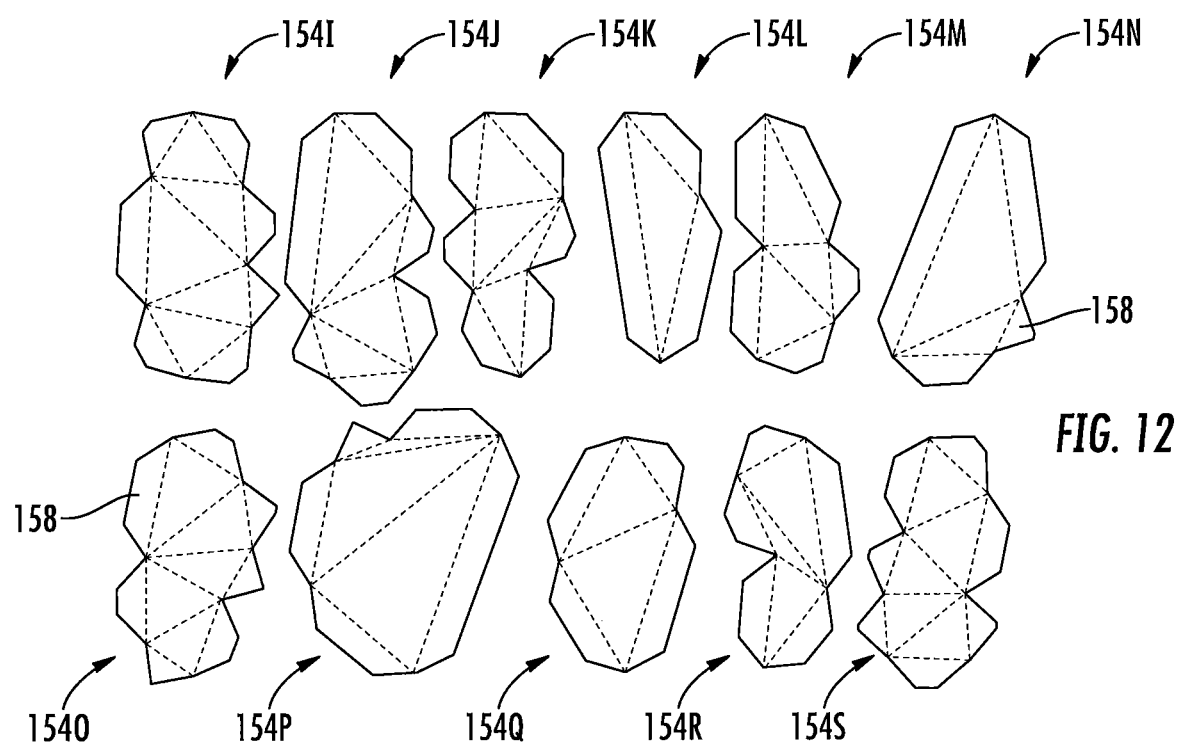

Referring now to FIGS. 11 and 12, the above-described operations may lead to a plurality of extracted preliminary segments 154A to 154S. Each preliminary segment 154A to 154S may include the selected polygons or triangles from the polygon or triangle mesh. Each preliminary segment 154A to 154S may include at least one polygon or triangle from the polygon or triangle mesh. At least one of the preliminary segments 154A to 154S may include 10 or more polygons or triangles from the polygon or triangle mesh. It will be appreciated that, although 19 preliminary segments are illustrated in FIGS. 11 and 12, these are merely representative and more than 50 or more than 100 preliminary segments may be formed.

Figure 9:
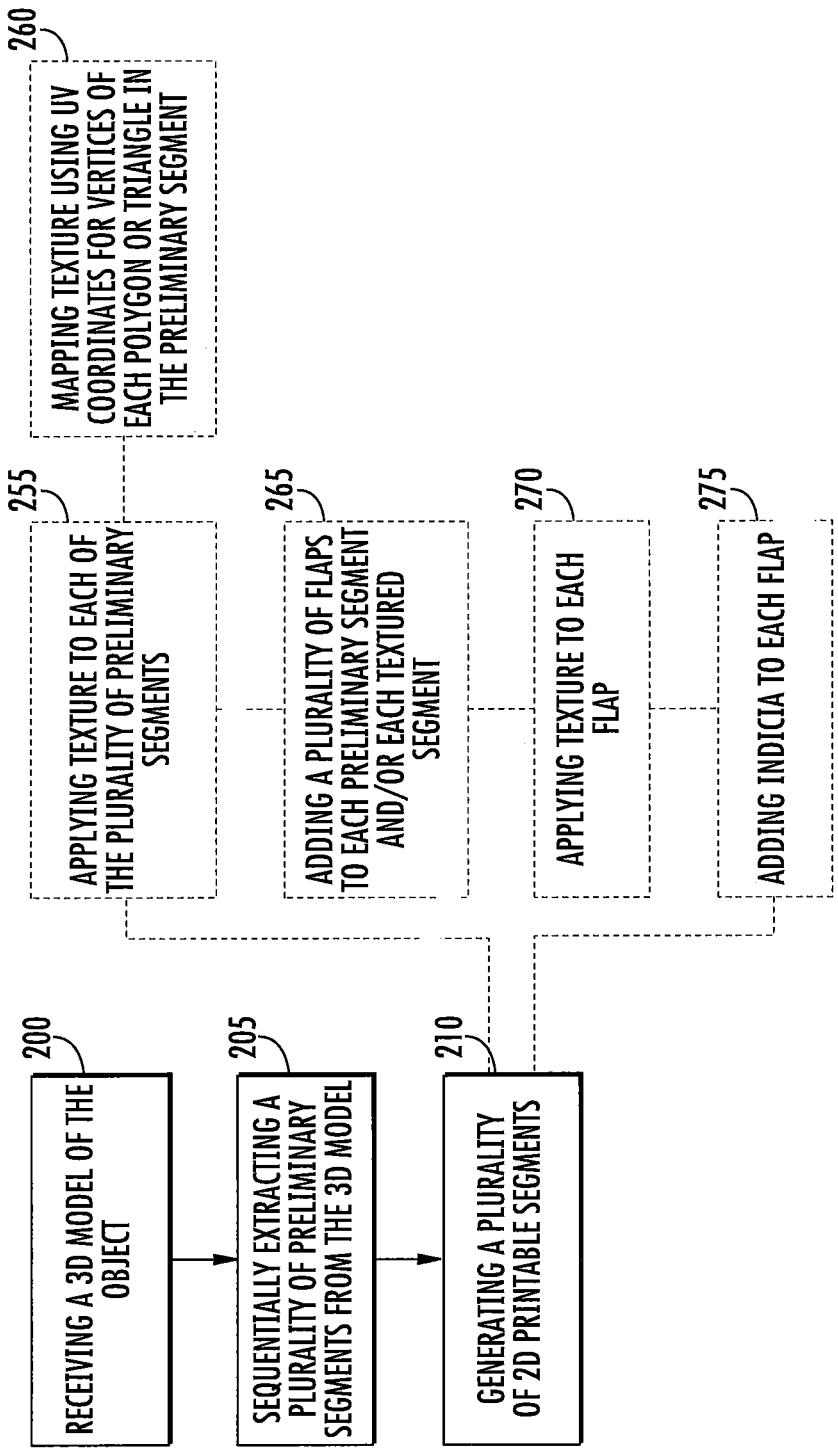

The 3D model 150 may include texture data corresponding to the polygon or triangle mesh 152 (FIG. 2). Referring to FIG. 9, generating a plurality of 2D printable segments may include applying texture from the texture data to each of the plurality of preliminary segments (Block 255). This may be carried out by mapping texture from the texture data using UV coordinates for vertices of each polygon or triangle in the preliminary segment (Block 260). Generating a 2D printable segment for each of the plurality of preliminary segments may include adding a plurality of flaps to each preliminary segment (Block 265). Generating a 2D printable segment for each of the plurality of preliminary segments may include applying texture to each flap, e.g., using the texture data at the edge of the polygon or triangle from which the flap extends (Block 270). Generating a 2D printable segment for each of the plurality of preliminary segments may include adding indicia to each flap (Block 275). The indicia on one flap of one of the printable segments may uniquely match the indicia on one flap of another one of the printable segments to indicate that the flaps should be coupled together.

Figure 13:
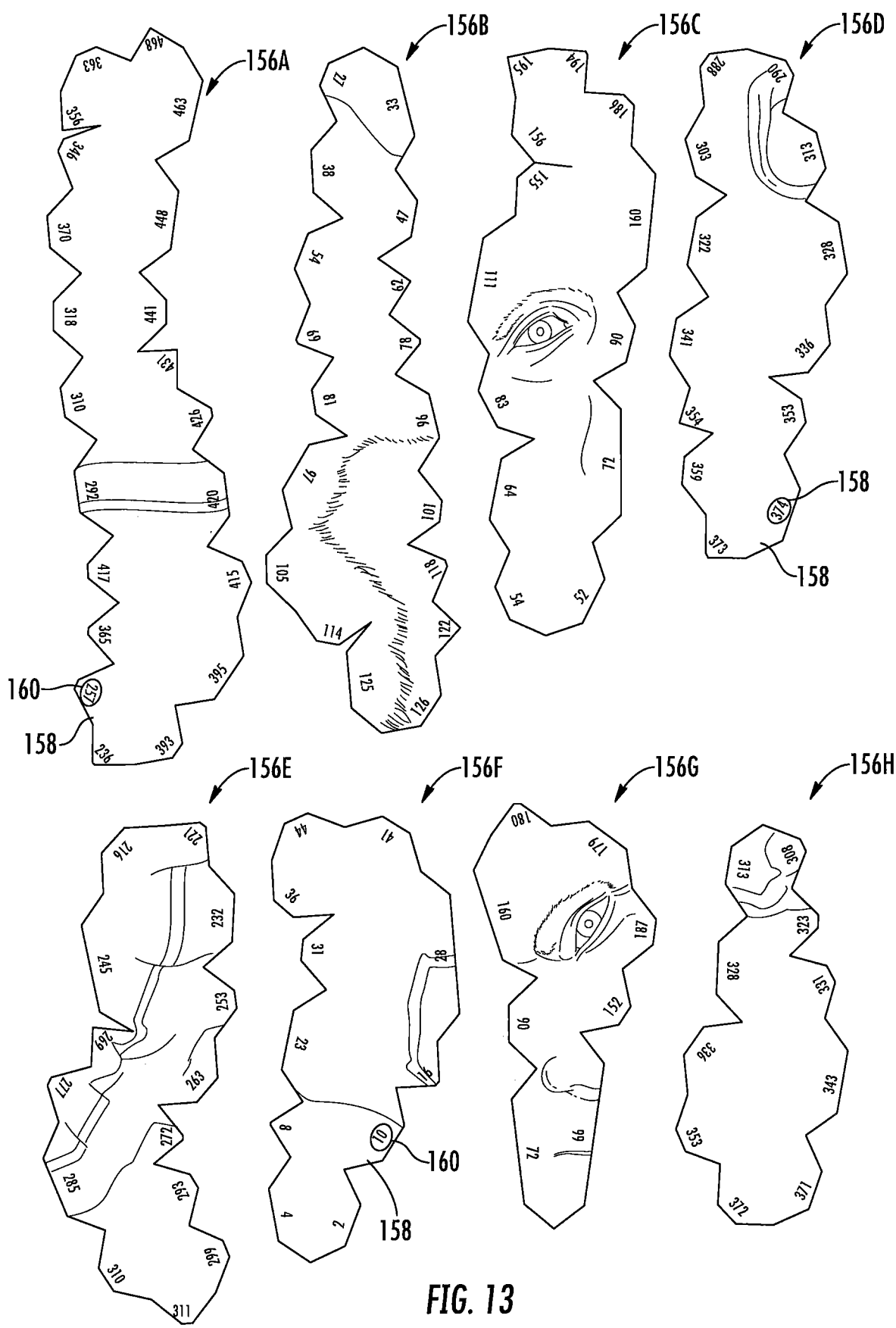
FIGS. 13 and 14 illustrate a plurality of printable segments according to some embodiments.
Figure 14:
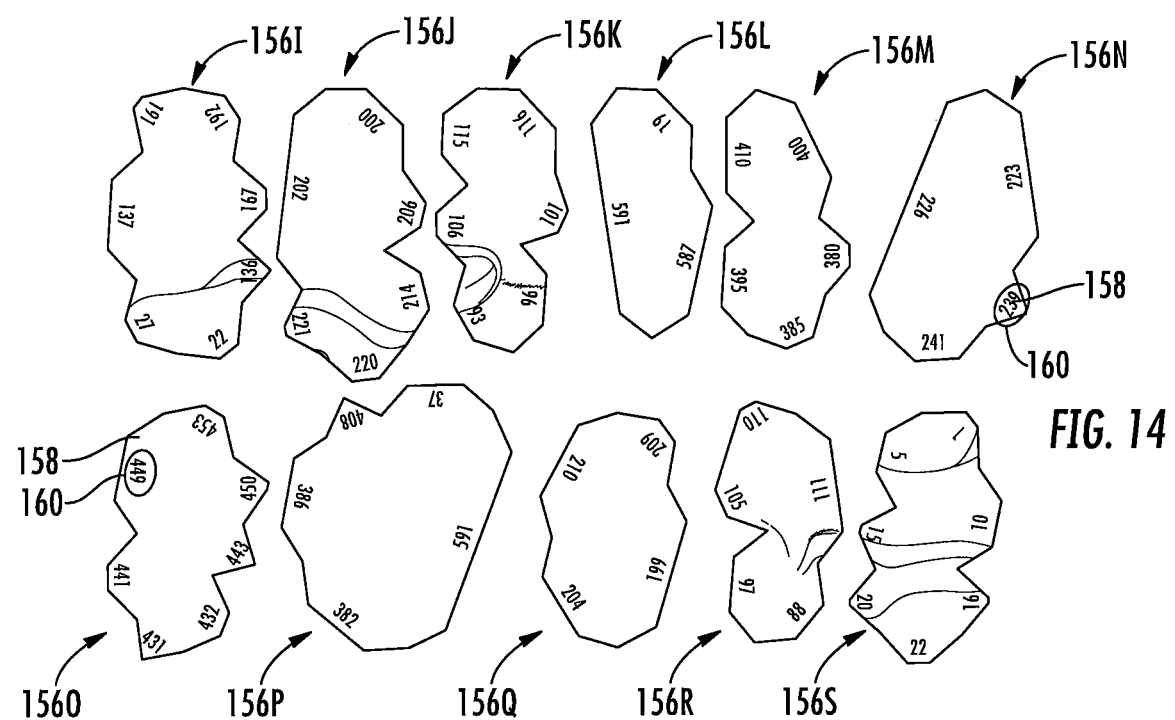

These operations are illustrated with reference to FIGS. 11-14. Texture may be mapped to each polygon or triangle in all the preliminary segments 154A to 154S. In some embodiments, each polygon or triangle is defined by three or more vertices which are all mapped with UV coordinates in the texture file. The resulting printable segments 156A to 156S including texture are illustrated in FIGS. 13 and 14, with the printable segments 156A to 156S corresponding to the preliminary segments 154A to 154S, respectively.

A plurality of flaps 158 may be added to each preliminary segment 154 and/or each printable segment 156. For example, referring to FIGS. 11 and 12, the flaps 158 are added to the preliminary segments 154A to 154S. In particular, a flap 158 may be added to each edge of a polygon or triangle from the polygon or triangle mesh that is not connected with another polygon or triangle within the same segment.

Texture from the texture data may be added to each flap 158. For example, the texture may be chosen from the texture along the edge of the polygon or triangle from which the flap extends. The texture may be stretched out along the width of the flap.

Indicia 160 may be added to each flap 158. As illustrated in FIGS. 13 and 14, the indicia may be a number. Each number may be assigned one flap on one of the printable segments 156 and to another one flap on a different one of the printable segments 156 to indicate that the flaps having the same number are to be coupled to one another along the respective polygon or triangle edges. Additionally or alternatively, the indicia may include a letter. The indicia may include a letter and a number, with one of the letter and number indicating which (printed) page a user can find the matching segment and the other one of the letter and number indicating the matching flap on the segment. For example, indicia 1B on a flap on page A may indicate there is a corresponding matching flap with indicia 1A on page B. The combination of the size (length and/or width) of the flaps, the texture of the flaps, and/or the indicia on the flaps may assist the user in the assembly of the 3D puzzle.

The flaps 158, and therefore the printed segments 164, may be coupled using, for example, adhesive or tape. In some embodiments, the flaps 158 are coupled using double-sided tape. When all the printed segments 164 have been properly coupled, the 3D puzzle is complete resulting in the 3D representation 166 as shown in FIGS. 4A and 4B.

Figure 10B:
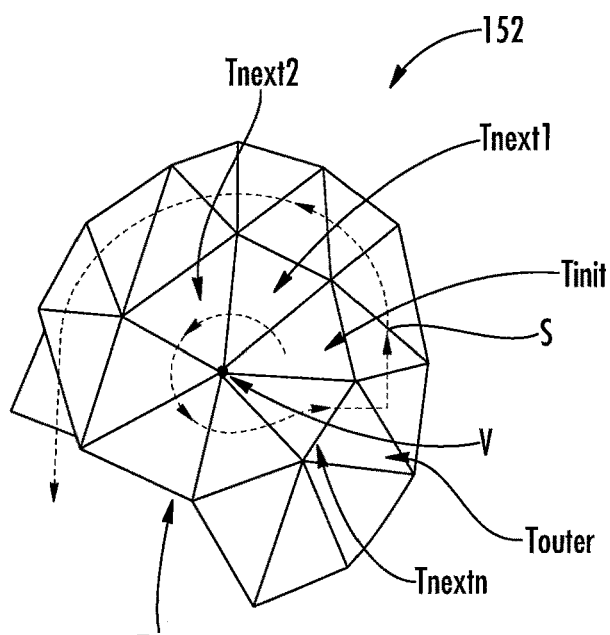
FIG. 10B is a fragmentary view of a triangle mesh illustrating the construction of segments in a spiral form according to some other embodiments.

Although a straight line process is described above, it is contemplated that segments may be extracted in other ways. For example, FIG. 10B illustrates the construction of a segment (or preliminary segment) using a spiral form. An initial triangle $T_{init}$ may be selected from the triangle mesh 152 (e.g., at random). The initial triangle $T_{init}$ shares a common or connecting vertex V with a set of triangles $T_{set}$ (corresponding to $T_{next1}$ to $T_{nextn}$ and including $T_{init}$ in FIG. 10B). Triangles from the set of triangles $T_{set}$ may be iteratively and/or sequentially selected (e.g., if the triangle or triangles have not been previously selected for another one of the extracted segments). For example, triangles that are intersected by a circular or spiral path S may be sequentially selected. When the process (or path S) reaches the initial triangle $T_{init}$, an outer triangle $T_{outer}$ to be selected may be the triangle connected by the edge that is not connected to any other triangle in the set of triangles $T_{set}$. The process then continues by selecting triangles adjacent the set of triangles $T_{set}$, moving outward from the initial triangle $T_{init}$ in the circular or spiral path S. There could be multiple "loops" or rings due to the spiral path. In some embodiments, the segment is constructed by selecting triangles until the circular or spiral path S intersects a triangle that has previously been selected for another one of the extracted segments. In some embodiments, the segment is constructed by selecting triangles until the segment reaches a predetermined threshold length. In some embodiments, as described above with the straight line method, the selected triangles may be rotated into the same plane as the initial triangle $T_{init}$.

Figure 15:
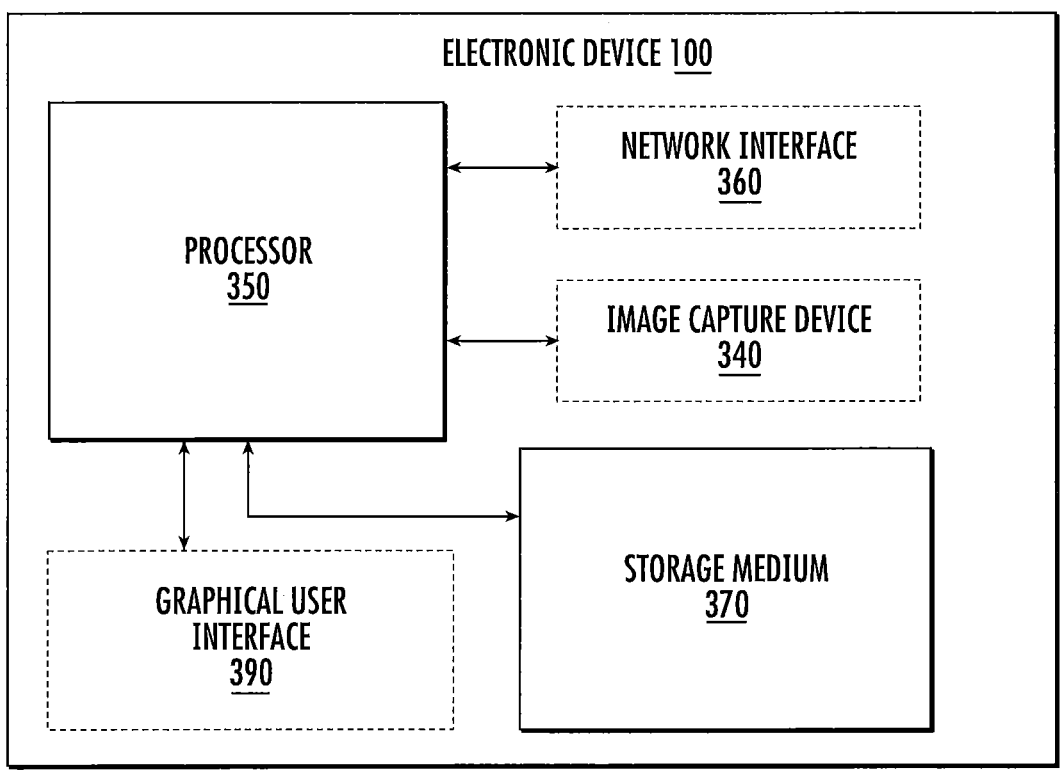
FIG. 15 is a block diagram of an electronic device of FIG. 1 or FIG. 3 according to various embodiments.

Referring now to FIG. 15, a block diagram is provided of an electronic device 100 of FIG. 1 or FIG. 3, according to various embodiments. The electronic device 100 may include a processor 350 and a storage medium 370. Moreover, the electronic device 100 may optionally include an image capture device 340, a network interface 360, and/or a Graphical User Interface (GUI) 390. The GUI 390 may include a display and/or a keypad or other interface that receives inputs from a user 110. In some embodiments, the GUI 390 may include a touchscreen. The image capture device 340 may be any camera or other device that captures image data of the object 135 that can be used to construct a 3D model 150 of the object 135. The processor 350 may be coupled to the network interface 360. The processor 350 may be configured to communicate with a device that provides image data (such as another electronic device 100) and/or with a printer 162, via the network interface 360.

For example, the network interface 360 may include one or more wireless interfaces (e.g., 3G/LTE, other cellular, WiFi, other short-range, etc.) and one or more physical wired interfaces (e.g., Ethernet, serial, USB interfaces, etc.).

Referring still to FIG. 15, the storage medium 370 may be coupled to the processor 350. The storage medium 370 may also store instructions/algorithms used by the processor 350. For example, the storage medium 370 of the electronic device 100 may include one or more algorithms that modify a 3D model 150, to extract the preliminary segments 154, and/or to generate the printable segments 156.

The electronic device 100 may optionally include the GUI 390. For example, a user 110 may use the GUI 390 at the electronic device 100 to capture, or otherwise obtain, image data with respect to the object 135 and/or to provide the printable segments 156 to the printer 162 (FIG. 3).

Figure 16:
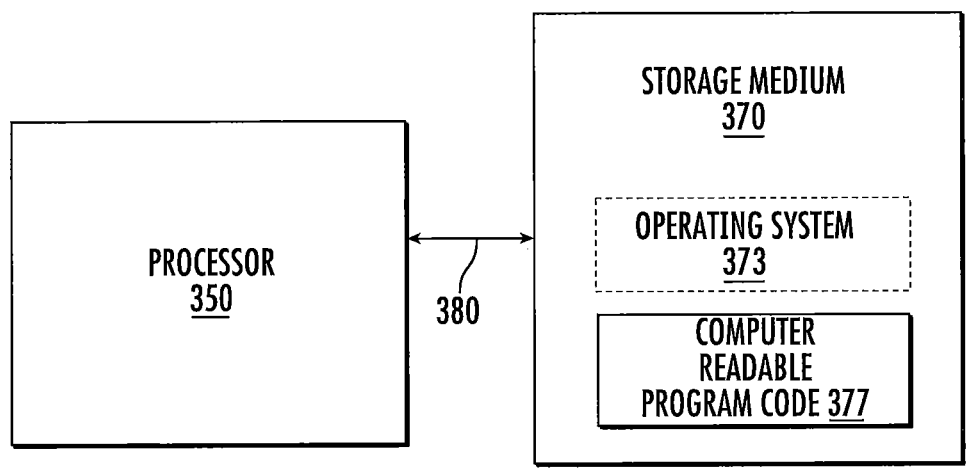
FIG. 16 is a block diagram that illustrates details of an example processor and memory that may be used in accordance with various embodiments.

Referring now to FIG. 16, a block diagram is provided that illustrates details of an example processor 350 and storage medium 370 of an electronic device 100 that may be used in accordance with various embodiments. The processor 350 communicates with the storage medium 370 via an address/data bus 380. The processor 350 may be, for example, a commercially available or custom microprocessor. Moreover, the processor 350 may include multiple processors. The storage medium 370 may be referred to herein as a "memory" and may be representative of the overall hierarchy of memory devices containing the software and data used to implement various functions of an electronic device 100 as described herein. The storage medium 370 may include, but is not limited to, the following types of devices: cache, ROM, PROM, EPROM, EEPROM, flash, Static RAM (SRAM), and Dynamic RAM (DRAM).

As shown in FIG. 16, the storage medium 370 may hold various categories of software and data, such as computer readable program code 377 and/or an operating system 373. The operating system 373 controls operations of an electronic device 100. In particular, the operating system 373 may manage the resources of an electronic device 100 and may coordinate execution of various programs by the processor 350. The computer readable program code 377, when executed by the processor 350, may cause the processor 350 to perform at least some of the operations described herein.

Although operations herein have been described in the context of modeling a human head, these operations may be applied to modeling other objects, including models of animals, automobiles, and various other objects.

Specific example embodiments of the present invention are described with reference to the accompanying drawings. The present invention may, however, be embodied in a variety of different forms and should not be construed as limited to the embodiments set forth herein. Rather, these embodiments are provided so that this disclosure will be thorough and complete and will fully convey the scope of the present invention to those skilled in the art. In the drawings, like designations refer to like elements. It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled, or responsive.

The terminology used herein is for the purpose of describing particular embodiments only and is not intended to be limiting of the present invention. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present invention.

Example embodiments of the present invention may be embodied as nodes, devices, apparatuses, and methods. Accordingly, example embodiments of the present invention may be embodied in hardware and/or in software (including firmware, resident software, micro-code, etc.). Furthermore, example embodiments of the present invention may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of the present invention are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In the specification, various embodiments of the present invention have been disclosed and, although specific terms are employed, they are used in a generic and descriptive sense only and not for purposes of limitation. Those skilled in the art will readily appreciate that many modifications are possible for the disclosed embodiments without materially departing from the teachings and advantages of the present invention. The invention is defined by the following claims, with equivalents of the claims to be included therein.

What is claimed is:

1. A method of creating a three-dimensional (3D) puzzle of an object, the method comprising:
    receiving a 3D model of the object;
    sequentially extracting a plurality of preliminary segments from the 3D model; and
    generating a plurality of two-dimensional (2D) printable segments corresponding to the plurality of preliminary segments,
    wherein the 3D model comprises a polygon mesh,
    sequentially extracting a plurality of preliminary segments from the 3D model comprises, for each preliminary segment, selecting a random polygon from the polygon mesh that has not been selected for another one of the plurality of preliminary segments as an initial polygon,
    the initial polygon is included as part of the preliminary segment,
    the polygon mesh is a triangle mesh,
    the initial polygon is an initial triangle, and
    sequentially extracting a plurality of preliminary segments from the 3D model comprises, for each preliminary segment:
    constructing a first direction segment in a first direction away from the initial triangle;
    constructing a second direction segment in a second direction, different than the first direction, away from the initial triangle;
    constructing a third direction segment in a third direction, different than the first and second directions, away from the initial triangle; and
    selecting the one of the first, second and third direction segments that has the longest length as the preliminary segment.

2. The method of claim 1 wherein the plurality of printable segments are configured to be printed to create a plurality of printed segments that are configured to be selectively coupled together to form a 3D representation of the object.

3. The method of claim 1 wherein sequentially extracting a plurality of preliminary segments from the 3D model comprises sequentially extracting the plurality of preliminary segments from the polygon mesh until each one of the polygons of the polygon mesh has been selected for one of the plurality of preliminary segments.

4. The method of claim 1 wherein:
constructing a first direction segment comprises selecting triangles from the triangle mesh that are intersected by a first straight line that extends in the first direction away from the initial triangle until the first line intersects a triangle that has previously been selected for another one of the preliminary segments or until a length of the first direction segment reaches a predetermined threshold length;
constructing a second direction segment comprises selecting triangles from the triangle mesh that are intersected by a second straight line that extends in the second direction away from the initial triangle until the second line intersects a triangle that has previously been selected for another one of the preliminary segments or until a length of the second direction segment reaches the predetermined threshold length; and
constructing a third direction segment comprises selecting triangles from the triangle mesh that are intersected by a third straight line that extends in the third direction away from the initial triangle until the third line intersects a triangle that has previously been selected for another one of the preliminary segments or until a length of the third direction segment reaches the predetermined threshold length.

5. The method of claim 4 wherein:
the first line extends in the first direction from a center of the initial triangle and through a midpoint of a first edge of the initial triangle;
the second line extends in the second direction from the center of the initial triangle and through a midpoint of a second edge of the initial triangle; and
the third line extends in the third direction from the center of the initial triangle and through a midpoint of a third edge of the initial triangle.

6. The method of claim 4 further comprising:
rotating the selected triangles in the first direction segment into the same plane as the initial triangle;
rotating the selected triangles in the second direction segment into the same plane as the initial triangle; and/or
rotating the selected triangles in the third direction segment into the same plane as the initial triangle.

7. The method of claim 1 wherein the object is or includes a head of a person.

8. The method of claim 1 wherein the plurality of printable segments comprise at least 50 segments or at least 100 segments.

9. The method of claim 1 further comprising:
providing the plurality of printable segments to a printer;
printing the plurality of printable segments to create the plurality of printed segments that correspond to the plurality of printable segments.

10. The method of claim 9 further comprising selectively coupling the printed segments to one another to form the 3D representation of the object.

11. A method of creating a three-dimensional (3D) puzzle of an object, the method comprising:

receiving a 3D model of the object;
sequentially extracting a plurality of preliminary segments from the 3D model; and
generating a plurality of two-dimensional (2D) printable segments corresponding to the plurality of preliminary segments,
wherein the 3D model comprises a polygon mesh,
sequentially extracting a plurality of preliminary segments from the 3D model comprises, for each preliminary segment, selecting a random polygon from the polygon mesh that has not been selected for another one of the plurality of preliminary segments as an initial polygon, and
the initial polygon is included as part of the preliminary segment,
wherein:
the 3D model comprises texture data corresponding to the polygon or triangle mesh; and
generating a plurality of 2D printable segments corresponding to the plurality of preliminary segments comprises applying texture from the texture data to each of the plurality of preliminary segments.

12. The method of claim 11 wherein the polygon mesh is a triangle mesh, wherein the initial polygon is an initial triangle, and wherein sequentially extracting a plurality of preliminary segments from the 3D model comprises, for each preliminary segment:
constructing a first direction segment in a first direction away from the initial triangle;
constructing a second direction segment in a second direction, different than the first direction, away from the initial triangle;
constructing a third direction segment in a third direction, different than the first and second directions, away from the initial triangle; and
selecting the one of the first, second and third direction segments that has the longest length as the preliminary segment.

13. The method of claim 11, wherein the polygon mesh is a triangle mesh, wherein the initial polygon is an initial triangle, and wherein sequentially extracting a plurality of preliminary segments from the 3D model comprises, for each preliminary segment:
selecting triangles in a set of triangles that share a common vertex with the initial triangle;
selecting an outer triangle that has an edge that is connected to an edge of one of the triangles in the set of triangles that does not share an edge with another one of the triangles in the set of triangles;
selecting triangles that are intersected by a circular or spiral path extending from the outer triangle and around the set of triangles until the circular or spiral path intersects a triangle that has previously been selected for another one of the preliminary segments; and
optionally rotating the selected triangles into the same plane as the initial triangle.

14. The method of claim 11 wherein applying texture from the texture data to each of the plurality of preliminary segments comprises mapping texture from the texture data using UV coordinates for vertices of each polygon or triangle in the preliminary segment.

15. The method of claim 11 wherein generating a plurality of 2D printable segments corresponding to the plurality of preliminary segments comprises adding a plurality of flaps to each preliminary segment.

16. The method of claim 15 wherein one of the flaps extends from each edge of each polygon or triangle in the preliminary segment that is not connected with another polygon or triangle in the preliminary segment.

17. The method of claim 16 further comprising applying texture to each flap using the texture data at the edge of the polygon or triangle from which the flap extends.

18. The method of claim 15 further comprising adding indicia to each flap, wherein the indicia on one flap of one of the printable segments uniquely matches the indicia on one flap of another one of the printable segments to indicate that the flaps should be coupled together, and wherein the indicia optionally comprises a number and/or a letter.

19. An electronic device comprising:
   a processor; and
   a storage medium coupled to the processor and comprising computer readable program code that when executed by the processor causes the processor to perform the method of claim 1.

20. A computer program product comprising:
   a non-transitory computer readable storage medium comprising computer readable program code embodied in the medium that when executed by a processor causes the processor to perform the method of claim 1.

* * * * *